United States Patent
Notake et al.

(10) Patent No.: US 11,274,585 B2
(45) Date of Patent: Mar. 15, 2022

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventors: Yasumasa Notake, Numazu (JP); Keishi Takada, Ashigarakami-gun (JP); Tetsuya Sakuma, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 144 days.

(21) Appl. No.: 16/741,790

(22) Filed: Jan. 14, 2020

(65) Prior Publication Data
US 2020/0224569 A1 Jul. 16, 2020

(30) Foreign Application Priority Data
Jan. 16, 2019 (JP) .............................. JP2019-005479

(51) Int. Cl.
*F01N 3/20* (2006.01)
*F01N 3/08* (2006.01)
(Continued)

(52) U.S. Cl.
CPC ......... *F01N 3/0892* (2013.01); *B01D 53/326* (2013.01); *F01N 3/2006* (2013.01);
(Continued)

(58) Field of Classification Search
CPC .. F01N 3/0892; F01N 3/2006; F01N 2240/20; F01N 2410/06
See application file for complete search history.

(56) References Cited

U.S. PATENT DOCUMENTS

2010/0115919 A1 5/2010 Yoda et al.
2010/0192550 A1* 8/2010 Tsujimoto ............. F01N 3/2053
60/287
(Continued)

FOREIGN PATENT DOCUMENTS

CN 101636567 A 1/2010
JP 2002-188431 A 7/2002
(Continued)

OTHER PUBLICATIONS

Machine translation of JP 2008-110277A, accessed Aug. 23, 2021. (Year: 2021).*

*Primary Examiner* — Jonathan R Matthias
(74) *Attorney, Agent, or Firm* — Oblon, McClelland, Maier & Neustadt, L.L.P.

(57) ABSTRACT

An exhaust purification system includes an electrochemical reactor provided in an engine exhaust passage; a bypass passage bypassing the electrochemical reactor; a flow control valve controlling an amount of exhaust gas, discharged from an engine body, flowing into the electrochemical reactor and the bypass passage; and a control device controlling the flow control valve. The electrochemical reactor includes a holding material holding $NO_X$ or HC and is configured so as to purify $NO_X$ or HC held at the holding material if energized. The control device controls the flow control valve so as to control the amount of exhaust gas flowing into the electrochemical reactor so that a temperature of the electrochemical reactor is maintained at less than a desorption start temperature where $NO_X$ or HC starts to be desorbed from the holding material.

9 Claims, 10 Drawing Sheets

(51) Int. Cl.
   *F01N 3/28*        (2006.01)
   *B01D 53/32*       (2006.01)
   *F01N 9/00*            (2006.01)
   *F01N 13/00*           (2010.01)
   *F01N 3/10*            (2006.01)
   *B01D 53/94*           (2006.01)

(52) U.S. Cl.
   CPC ........ *F01N 3/2892* (2013.01); *B01D 53/9454* (2013.01); *B01D 53/9495* (2013.01); *F01N 3/101* (2013.01); *F01N 3/2882* (2013.01); *F01N 9/00* (2013.01); *F01N 13/011* (2014.06); *F01N 2410/06* (2013.01); *F01N 2900/0416* (2013.01); *F01N 2900/1602* (2013.01)

(56) References Cited

U.S. PATENT DOCUMENTS

| | | |
|---|---|---|
| 2010/0307141 A1 | 12/2010 | Wakao et al. |
| 2013/0101474 A1* | 4/2013 | Nakayama ......... B01D 53/9422 422/182 |
| 2018/0087422 A1* | 3/2018 | Ulrey .................... F01N 3/0842 |

FOREIGN PATENT DOCUMENTS

| | | |
|---|---|---|
| JP | 2008-110277 A | 5/2008 |
| JP | 2009-103090 A | 5/2009 |
| JP | 2010-001779 A | 1/2010 |

\* cited by examiner

EXHAUST PURIFICATION SYSTEM OF INTERNAL COMBUSTION ENGINE

FIELD

The present disclosure relates to an exhaust purification system of an internal combustion engine.

BACKGROUND

Known in the past has been an exhaust purification system of an internal combustion engine provided inside an exhaust passage with an electrochemical reactor provided with ion conducting solid electrolyte layers and with anode layers and cathode layers arranged on the surfaces of the solid electrolyte layers (for example, PTL 1). In such an electrochemical reactor, if the electrochemical reactor is supplied with current so as to flow from the anode layers through the solid electrolyte layers to the cathode layers, $NO_X$ is reduced to $N_2$ and purified on the cathode layers.

In particular, in the exhaust purification system of PTL 1, the cathode layer is configured so as to enable $NO_X$ to be held. Due to this, even if oxygen obstructing a chemical reaction of $NO_X$ in the cathode layer is excessively present, the $NO_X$ is selectively held at the cathode layer and accordingly the $NO_X$ can be efficiently purified.

CITATIONS LIST

Patent Literature

[PTL 1] Japanese Unexamined Patent Publication No. 2008-110277

SUMMARY

Technical Problem

In this regard, the holding material holding the $NO_X$ holds the $NO_X$ in the exhaust gas when the temperature is relatively low, but if the temperature increases to equal to or greater than a desorption start temperature, the held $NO_X$ is released. For this reason, for example, while the temperature of the electrochemical reactor is low right after cold start of an internal combustion engine, it is possible to make the holding material hold the $NO_X$ and purify $NO_X$ by the electrochemical reactor. However, if the temperature of the electrochemical reactor is equal to or greater than the desorption start temperature, before energizing the electrochemical reactor to thereby purify $NO_X$, $NO_X$ is desorbed from the holding material and $NO_X$ cannot be sufficiently purified. Further, the same is true when providing the electrochemical reactor with a holding material for holding HC.

Considering the above problem, an object of the present disclosure is to keep $NO_X$ or HC held at a holding material from not being purified but being desorbed to thereby raise the performance of the exhaust purification system in purifying $NO_X$ or HC.

Solution to Problem

The present invention was made so as to solve the above problem and has as its gist the following.

(1) An exhaust purification system of an internal combustion engine, comprising: an electrochemical reactor provided in an engine exhaust passage; a bypass passage bypassing the electrochemical reactor; a flow control valve controlling an amount of exhaust gas, discharged from an engine body, flowing into the electrochemical reactor and the bypass passage; and, an ECU controlling the flow control valve, wherein the electrochemical reactor comprises a holding material holding $NO_X$ or HC and is configured so as to purify $NO_X$ or HC held at the holding material if energized, and the ECU is configured to control the flow control valve so as to control the amount of exhaust gas flowing into the electrochemical reactor so that a temperature of the electrochemical reactor is maintained at less than a desorption start temperature where $NO_X$ or HC starts to be desorbed from the holding material.

(2) The exhaust purification system of an internal combustion engine according to above (1), wherein in the engine exhaust passage, an exhaust purification catalyst is provided at an upstream side from a branching part to the bypass passage.

(3) The exhaust purification system of an internal combustion engine according to above (2), wherein the ECU is configured to control the flow control valve so that exhaust gas does not flow into the electrochemical reactor when a temperature of the exhaust purification catalyst is equal to or greater than an activation temperature.

(4) The exhaust purification system of an internal combustion engine according to above (2) or (3), wherein the ECU is configured to control the flow control valve so that all of the exhaust gas flows into the electrochemical reactor when a temperature of the exhaust purification catalyst is less than the activation temperature.

(5) The exhaust purification system of an internal combustion engine according to any one of above (2) to (4), wherein the exhaust purification catalyst and the electrochemical reactor are configured so that when the internal combustion engine is cold started, even if the flow control valve is controlled so that all of the exhaust gas flows into the electrochemical reactor, the temperature of the exhaust purification catalyst reaches the activation temperature before the temperature of the electrochemical reactor reaches the desorption start temperature.

(6) The exhaust purification system of an internal combustion engine according to above (1) or (2), wherein the ECU is configured to control the flow control valve so that all of the exhaust gas flows into the electrochemical reactor at the time of cold start of the internal combustion engine, and control the flow control valve so that the exhaust gas does not flow into the electrochemical reactor if the temperature of the electrochemical reactor reaches a predetermined temperature less than the desorption start temperature.

(7) The exhaust purification system of an internal combustion engine according to any one of above (1) to (6), wherein the ECU is configured to control energization of the electrochemical reactor, wherein the ECU is configured to energize the electrochemical reactor, when the flow control valve is controlled so that exhaust gas flows into the electrochemical reactor, and energizes the electrochemical reactor, when it is estimated that the holding material is holding the $NO_X$ or HC, when the flow control valve is controlled so that exhaust gas does not flow into the electrochemical reactor.

(8) The exhaust purification system of an internal combustion engine according to above (1) to (7), further comprising a circulation passage provided between a branching part and merging part of the bypass passage and straddling the electrochemical reactor, wherein the circulation passage is configured so that the exhaust gas circulates in the circulation passage when the flow control valve is controlled so that exhaust gas does not flow into the electrochemical reactor.

(9) The exhaust purification system of an internal combustion engine according to above (8), wherein the circulation passage is provided with a circulation pump for making exhaust gas circulate in the circulation passage.

(10) The exhaust purification system of an internal combustion engine according to above (8) or (9), wherein the circulation passage comprises a first passage relatively close to the bypass passage and a second passage relatively far from the bypass passage, and the first passage and the second passage are arranged offset from each other in the vertical direction.

Advantageous Effects of Invention

According to the present disclosure, it is possible to keep $NO_X$ or HC held at a holding material from not being purified but being desorbed to thereby raise the performance of the exhaust purification system in purifying $NO_X$ or HC.

DESCRIPTION OF EMBODIMENTS

Figure 1:
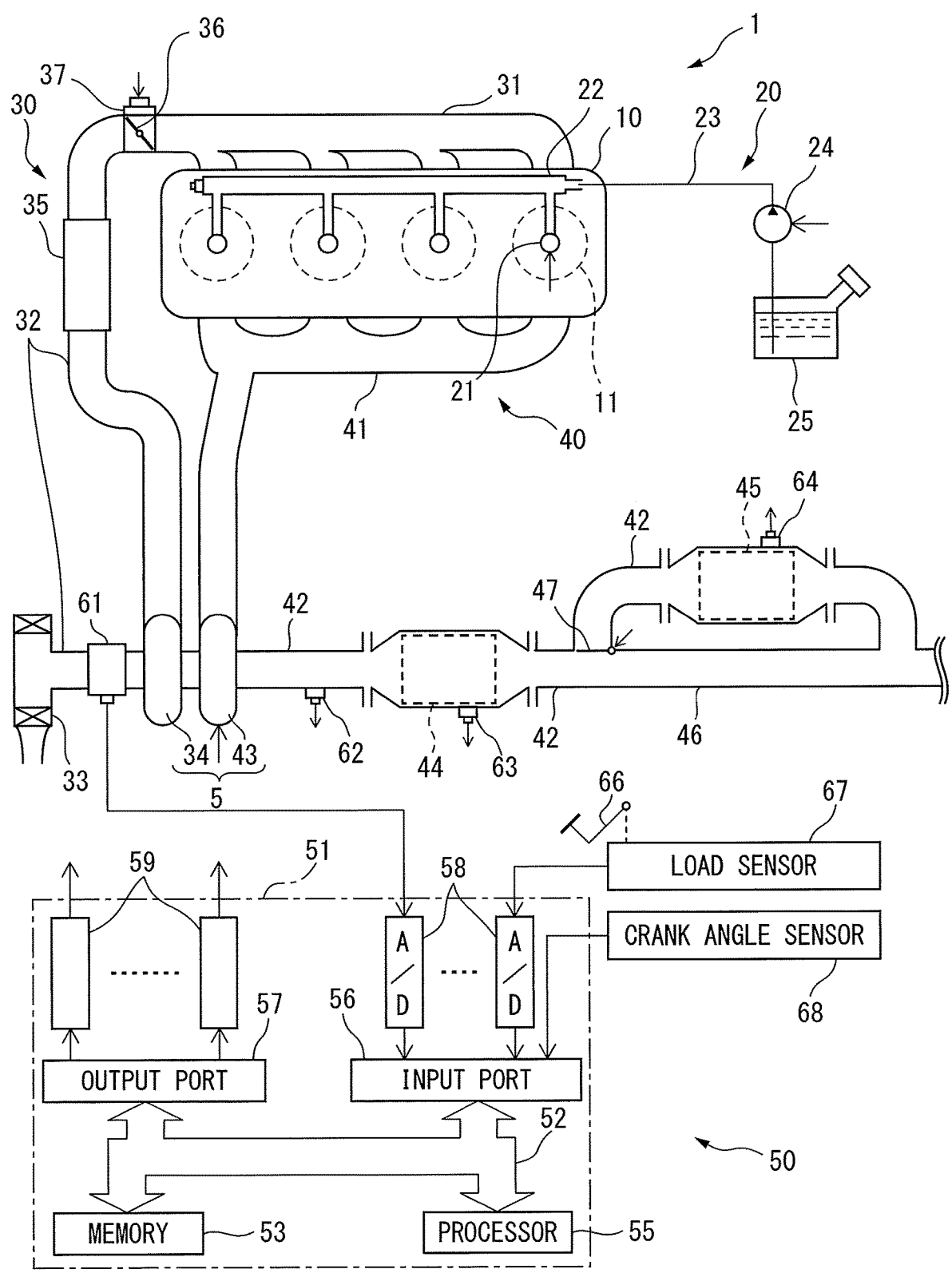
FIG. 1 is a schematic view of the configuration of an internal combustion engine in which an electrochemical reactor is mounted.

Below, referring to the drawings, embodiments will be explained in detail. Note that, in the following explanation, similar component elements are assigned the same reference numerals.

First Embodiment

Explanation of Internal Combustion Engine as a Whole

First, referring to FIG. 1, the configuration of an internal combustion engine 1 provided with an exhaust purification system of a first embodiment will be explained. FIG. 1 is a schematic view of the configuration of the internal combustion engine 1. As shown in FIG. 1, the internal combustion engine 1 is provided with an engine body 10, fuel feed system 20, intake system 30, exhaust system 40 and control device 50.

The engine body 10 is provided with a cylinder block in which a plurality of cylinders 11 are formed, a cylinder head and a crank case. A piston 14 is arranged in each cylinder 11, and each cylinder 11 is connected to intake ports and exhaust port.

The fuel feed system 20 is provided with fuel injectors 21, a delivery pipe 22, fuel feed pipe 23, fuel pump 24, and fuel tank 25. Each fuel injector 31 is arranged in the cylinder head so as to directly inject fuel into each cylinder 11. The fuel pumped out by the fuel pump 24 is supplied through the fuel feed pipe 23 to the delivery pipe 22, and then is injected from the fuel injector 21 into the cylinder 11.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and the intake pipe 32 with the air cleaner 33. The intake pipe 32 is provided with the compressor 34 of the exhaust turbocharger 5 for compressing and discharging intake air flowing through the intake pipe 32, and the intercooler 35 for cooling the air compressed by the compressor 34. The throttle valve 36 is driven so as to be opened and closed, by a throttle valve drive actuator 37. The intake port, intake manifold 31 and intake pipe 32 form an intake passage.

The exhaust system 40 configures a part of the exhaust purification system of the internal combustion engine 1. The exhaust system 40 is provided with an exhaust manifold 41, exhaust pipe 42, turbine 43 of the exhaust turbocharger 5, exhaust purification catalyst 44, and electrochemical reactor (hereinafter, simply referred to as "reactor") 45. The exhaust port of each cylinder 11 is communicated through the exhaust manifold 51 and the exhaust pipe 52 with the exhaust purification catalyst 44, and the exhaust purification catalyst is communicated through the exhaust pipe 42 with the electrochemical reactor 45. The exhaust purification catalyst 44 is, for example, a three-way catalyst or NOx storage reduction catalyst, and purify composition in the exhaust gas, such as NOx or unburned HC when the temperature thereof is equal to or greater than a constant activation temperature. In the exhaust pipe 42, the turbine 43 of the exhaust turbocharger 5, which is driven to rotate by the energy of the exhaust gas, is provided. The exhaust port, exhaust manifold 41, exhaust pipe 42, exhaust purification catalyst 44 and reactor 45 form an exhaust passage. Note that the exhaust purification catalyst 44 may be provided downstream side of the reactor 45 in the flow direction of the exhaust gas.

Further, in the present embodiment, the exhaust system 40 is provided with a bypass pipe 46 and a flow control valve 47. The bypass pipe 46 defines a bypass passage bypassing the reactor 45. Therefore, the bypass pipe 46 branches from the exhaust pipe 42 at an upstream side from the reactor 45 in the direction of flow of exhaust (below, simply referred to as the "upstream side") and merges with the exhaust pipe 42 at a downstream side from the reactor 45 in the direction of flow of exhaust (below, simply referred to as the "downstream side"). In particular, in the present embodiment, the exhaust purification catalyst 44 is provided at the upstream side of the branching part of the bypass pipe 46.

The flow control valve 47, in the present embodiment, is provided at the branching part of the bypass pipe 46 and controls the amount of flow into the reactor 45 and the bypass pipe 46 of the exhaust gas discharged from the engine body 10 and flowing through the exhaust purification catalyst 44. Therefore, the flow control valve 47 is configured to be able to be changed at least among a state where the exhaust gas flows into only the reactor 45 (below, also referred to as the "reactor inflow state"), a state where the exhaust gas flows into only the bypass pipe 46 (below, also referred to as the "bypass inflow state"), and a state where the exhaust gas flows into both of the reactor 45 and the bypass pipe 46.

Note that, the flow control valve 47 may also be provided at a merging part of the bypass pipe 46 or other position other than the branching part of the bypass pipe 46. Further, the flow control valve 47 may also be a switching valve switching a destination of flow of the exhaust gas between the reactor 45 and the bypass pipe 46.

The control device 50 is provided with an electronic control unit (ECU) 51 and various sensors. The ECU 51 is configured by a digital computer and is provided with a memory 53, processor 55, input port 56, and output port 57, which are connected to each other by a bidirectional bus 52.

The intake pipe 32 is provided with a flow sensor 61 for detecting the amount of intake gas flowing through the intake pipe 32 (for example, an air flow meter). Further, the exhaust pipe 42 at the upstream side of the exhaust purification catalyst 44 (or exhaust manifold 41) is provided with an air-fuel ratio sensor 62 for detecting an air-fuel ratio of exhaust gas flowing into the exhaust purification catalyst 44. Further, the exhaust purification catalyst 44 is provided with a temperature sensor 63 for detecting the temperature of the exhaust purification catalyst 44. Furthermore, the reactor 45 is provided with a temperature sensor 64 for detecting the temperature of the reactor 45. The outputs of these flow sensor 61, air-fuel ratio sensor 62, and temperature sensors 63, 64 are input through corresponding AD converters 58 to the input port 56.

Further, a load sensor 67 generating an output voltage proportional to the amount of depression of an accelerator pedal 66 is connected to the accelerator pedal 66. The output voltage of the load sensor 67 is input through a corresponding AD converter 58 to the input port 56. The crank angle sensor 68 generates an output pulse each time the crankshaft of the engine body 10 rotates by for example 10°. This output pulse is input to the input port 56. At the CPU 55, the engine speed is calculated based on this output pulse.

On the other hand, the output port 57 of the ECU 51 is connected through corresponding drive circuits 59, to the actuators controlling the operation of the internal combustion engine 1. In the example shown in FIG. 1, the output port 57 is connected to the fuel injectors 21, fuel pump 24, throttle valve drive actuator 37 and flow control valve 47 and controls these actuators. The ECU 51 outputs control signals from the output ports 57 to control these actuators.

Explanation of Electrochemical Reactor

Figure 2:
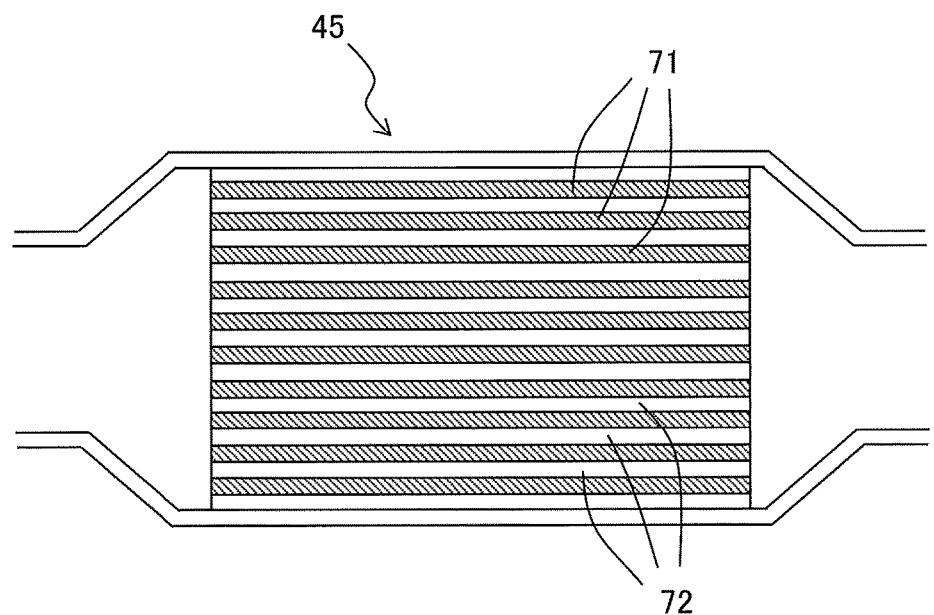
FIG. 2 is a cross-sectional side view of the electrochemical reactor.

Next, referring to FIGS. 2 and 3, the configuration of the reactor 45 according to the present embodiment will be explained. FIG. 2 is a cross-sectional side view of the reactor 45. As shown in FIG. 2, the reactor 45 is provided with partition walls 71 and passages 72 defined by the partition walls. The partition walls 71 are provided with a plurality of first partition walls extending parallel to each other and a plurality of second partition walls extending perpendicular to the first partition walls and parallel to each other. The passages 72 are defined by these first partition walls and second partition walls and extend parallel to each other. The exhaust gas flowing into the reactor 45 flows passing through the plurality of passages 72. Note that, the partition walls 71 may also be formed from only the plurality of partition walls extending parallel to each other and formed without being provided with partition walls perpendicular to these plurality of partition walls.

Figure 3:
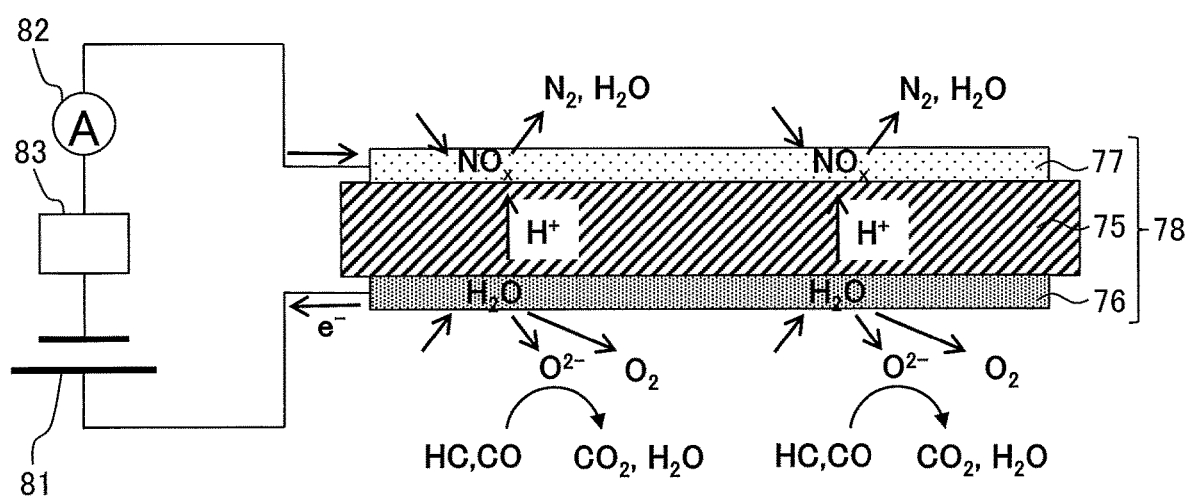
FIG. 3 is an enlarged cross-sectional view of a partition wall of the electrochemical reactor.

FIG. 3 is an enlarged cross-sectional view of a partition wall 71 of the reactor 45. As shown in FIG. 3, the partition wall 71 of the reactor 45 is provided with a solid electrolyte layer 75, an anode layer 76 arranged on one surface of the solid electrolyte layer 75, and a cathode layer 77 arranged on the surface of the solid electrolyte layer 75 at the opposite side to the surface at which the anode layer 76 is arranged. The solid electrolyte layer 75, an anode layer 76 and cathode layer 77 form a cell 78.

The solid electrolyte layer 75 includes a porous solid electrolyte having proton conductivity. As the solid electrolyte, for example, a perovskite type metal oxide $MM'_{1-x}R_xO_{3-\alpha}$ (M=Ba, Sr, Ca, M'=Ce, Zr, R=Y, Yb, for example, $SrZr_xYb_{1-x}O_{3-\alpha}$, $SrCeO_3$, $BaCeO_3$, $CaZrO_3$, $SrZrO_3$, etc.), a phosphate (for example, $SiO_2$—$P_2O_5$-based glass, etc.), metal doped $Sn_xIn_{1-x}P_2O_7$ (for example, $SnP_2O_7$, etc.) or zeolite (for example, ZSM-5) are used.

The anode layer 76 and the cathode layer 77 both include Pt, Pd, Rh, or other noble metals. Further, the anode layer 76 includes a substance able to hold (that is, able to adsorb and/or absorb) water molecules (water molecule holding member). Specifically, the substance able to hold water molecules includes zeolite, silica gel, activated alumina, etc.

On the other hand, the cathode layer 77 includes a substance able to hold (that is, able to adsorb and/or absorb) $NO_X$ (a $NO_X$ holding agent). Specifically, the substance able to hold $NO_X$ includes K, Na, or another alkali metal, Ba or another alkali earth metal, La or another rare earth, etc. In particular, the $NO_X$ holding agent holds $NO_X$ in the exhaust gas if the temperature thereof is a low temperature less than the desorption start temperature (for example, 150° C.). On the other hand, in the $NO_X$ holding agent, $NO_X$ held by the $NO_X$ holding agent is desorbed from the $NO_X$ holding agent, if the temperature of the $NO_X$ holding agent is equal to or higher than the desorption start temperature.

Further, the internal combustion engine 1 is provided with the power device 81, ammeter 82, and voltage regulator 83. The positive electrode of the power device 81 is connected to the anode layers 76, while the negative electrode of the power device 81 is connected to the cathode layers 77. The voltage regulator 83 is configured to be able to change the voltage applied between the anode layers 76 and the cathode layers 77. Further, the voltage regulator 83 is configured to change the magnitude of the current supplied to the reactor 45 so that it flows from the anode layers 76 through the solid electrolyte layers 75 to the cathode layers 77.

The power device 81 is connected in series with the ammeter 82. Further, the ammeter 82 is connected to the input port 56 through the corresponding AD converter 58. The voltage regulator 83 is connected to the output port 57 of the ECU 51 through the corresponding drive circuit 59 and is controlled by the ECU 51. Therefore, the voltage regulator 83 and ECU 51 function as an energizing control part for controlling the magnitude of voltage applied between the anode layer 76 and cathode layer 77 (i.e., energization to the reactor 45).

At the reactor 45 configured as above, if current flows from the power device 81 to the anode layers 76 and cathode layers 77, reactions such as shown in the following formulas occur at the anode layers 76 and cathode layers 77:

$$2H_2O \rightarrow 4H^+ + O_2 + 4e^-$$ Anode side:

$$H_2O \rightarrow 2H^+ + O^{2-}$$

$$2NO + 4H^+ + 4e^- \rightarrow N_2 + 2H_2O$$ Cathode side:

That is, at the anode layers 76, the water molecules held at the anode layers 76 are electrolyzed whereby oxygen and oxygen ion and protons are generated. The generated oxygen is discharged into the exhaust gas while the generated protons move through the solid electrolyte layers 75 from the anode layers 76 to the cathode layers 77. At the cathode layers 77, the NO held at the cathode layers 77 reacts with the protons and electrons whereby nitrogen and water molecules are generated.

Therefore, according to the present embodiment, by applying current from the power device 81 of the reactor 45 to the anode layers 76 and cathode layers 77 (i.e., energizing to the reactor 45), the NO held by the $NO_X$ holding agent of the cathode layer 77 can be reduced to $N_2$ and purified.

Further, at the anode layers 76, when the exhaust gas contains unburned HC or CO, etc., due to the reactions shown in the following formulas, the oxygen ions react with the HC and CO whereby carbon dioxide and water are generated. Note that, unburned HC contains various constituents, therefore in the following reaction formulas, unburned HC is represented as $C_mH_n$. Therefore, according to the present embodiment, by applying current from the power device 81 of the reactor 45 to the anode layer 76 and cathode layer 77, the HC and CO in the exhaust gas can be oxidized and purified:

$$C_mH_n + (2m+0.5n)O^{2-} \rightarrow mCO_2 + 0.5nH_2O + (4m+n)e^-$$

$$CO + O^{2-} \rightarrow CO_2 + 2e^-$$

Further, the anode layer 76 may include a substance able to hold unburned HC (that is, able to adsorb and/or absorb it) (HC holding material). The substance which can hold HC specifically may include zeolite, etc. If the anode layer 76 includes a substance able to hold HC, the held HC and oxygen ions react and the held HC is purified. In this case, the HC holding material holds the unburned HC in the exhaust gas when the temperature is a low temperature less than the desorption start temperature (for example, 150° C.). On the other hand, in the HC holding material, when the temperature is equal to or greater than the desorption start temperature, unburned HC held at the HC holding material is desorbed from the HC holding material.

If the anode layer 76 is provided with an HC holding material, by applying current from the power device 81 of the reactor 45 to the anode layer 76 and cathode layer 77 (that is, by "energizing" the reactor 45), it is possible to oxidize the HC held in the HC holding material of the anode layer 76 to water and carbon dioxide to purify it.

Note that, in the above embodiment, the anode layer 76 and cathode layer 77 are arranged on the two surfaces of the opposite sides of the solid electrolyte layer 75. However, the anode layer 76 and cathode layer 77 may also be arranged on the same surface of the solid electrolyte layer 75. In this case, protons move through the vicinity of the surface of the solid electrolyte layer 75 on which the anode layer 76 and cathode layer 77 are arranged.

Figure 4:
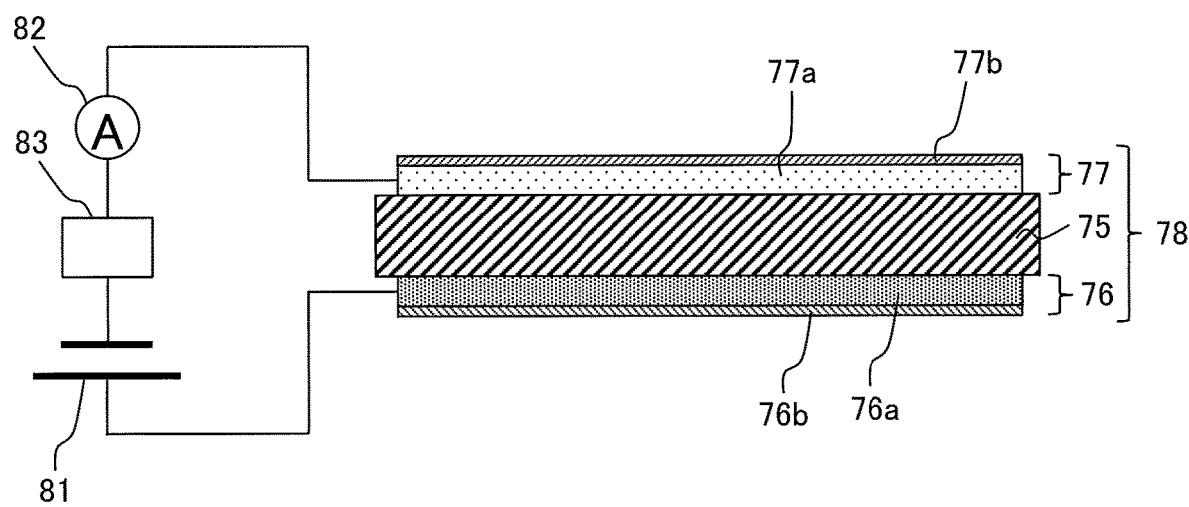
FIG. 4 is an enlarged cross-sectional view of a partition wall of the electrochemical reactor.

Further, as shown in FIG. 4, the anode layer 76 may also include the two layers of the conductive layer 76a including a noble metal having electroconductivity and a water/HC holding layer 76b including a substance able to hold water molecules or HC. In this case, a conductive layer 76a is arranged on the surface of the solid electrolyte layer 75. The water/HC holding layer 76b is arranged on the surface of the conductive layer 76a at the opposite side to the solid electrolyte layer 75 side.

Similarly, the cathode layer 77 may also contain the two layers of the conductive layer 77a including a noble metal having electroconductivity and an $NO_X$ holding layer 77b including a substance able to hold $NO_X$. In this case, the conductive layer 77a is arranged on the surface of the solid electrolyte layer 75, while the $NO_X$ holding layer 77b is arranged on the surface of the conductive layer 77a at the opposite side to the solid electrolyte layer 75 side.

Further, in the present embodiment, the solid electrolyte layer 75 of the reactor 45 includes a proton conducting solid electrolyte. However, the solid electrolyte layer 75 may also be configured so as to include an oxygen ion conducting solid electrolyte, etc., or other ion conducting solid electrolyte, instead of a proton conducting solid electrolyte.

Exhaust Gas in Case of No Bypass Pipe

In this regard, consider the case where, unlike the present embodiment, the internal combustion engine is not provided with a bypass pipe 46 for bypassing the reactor 45. In this case, all of the exhaust gas flowing out from the exhaust purification catalyst 44 flows into the reactor 45.

Figure 5:
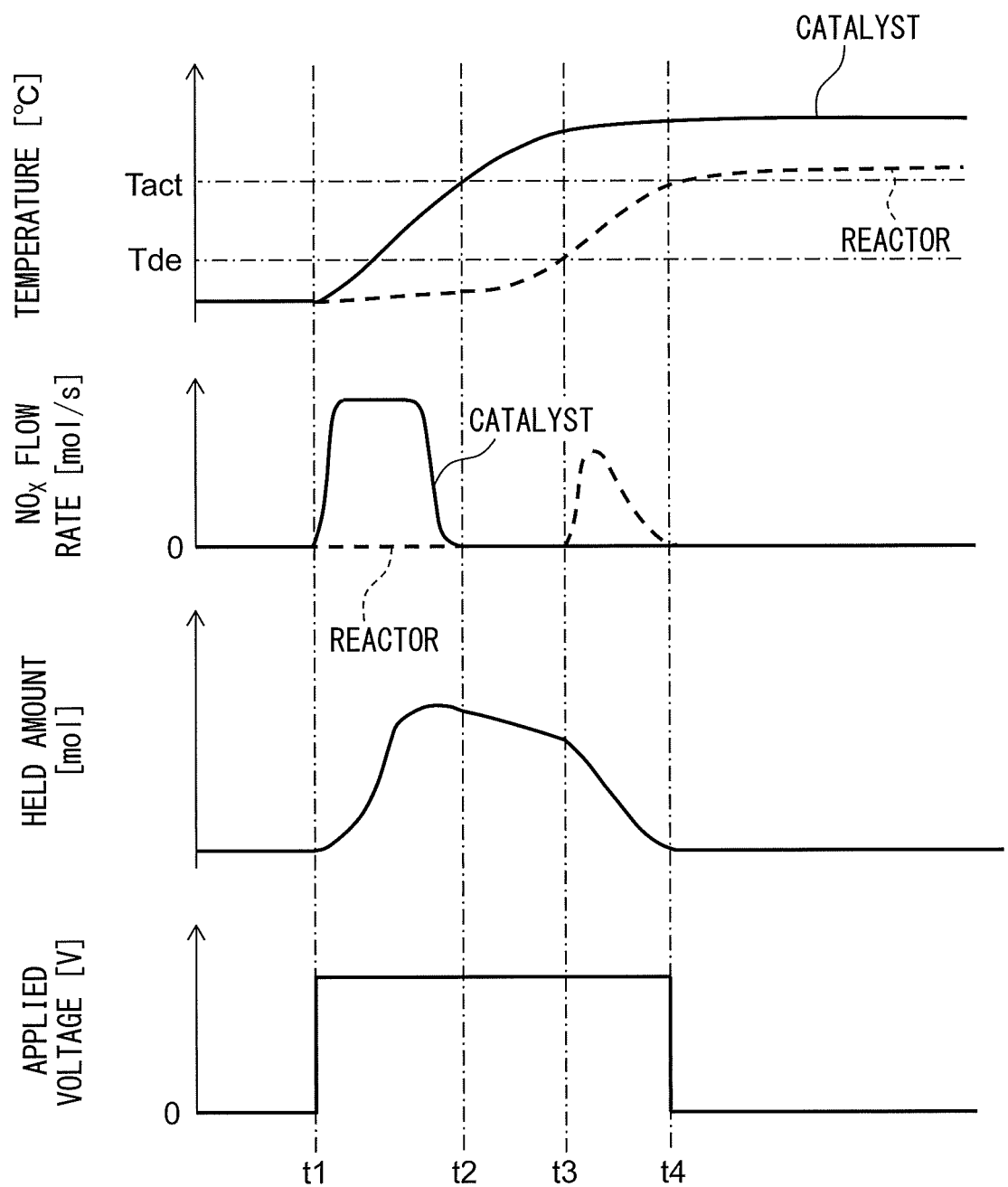
FIG. 5 is a time chart of temperatures of an exhaust purification catalyst and reactor, etc., at the time of cold start of an internal combustion engine in which no bypass pipe is provided.

FIG. 5 is a time chart of temperatures of an exhaust purification catalyst 44 and reactor 45, amounts of outflow of $NO_X$ from the exhaust purification catalyst 44 and reactor 45, amount of $NO_X$ held at the $NO_X$ holding material of the reactor 45, and voltage applied to the reactor 45 at the time of cold start of an internal combustion engine in which no bypass pipe is provided. In the figure, the solid lines show the temperature of the exhaust purification catalyst 44 and the amount of outflow of $NO_X$ from the exhaust purification catalyst 44, while the broken lines show the temperature of the reactor 45 and the amount of outflow of $NO_X$ from the reactor 45. Further, Tact shows the activation temperature of the exhaust purification catalyst 44, while Tde shows the desorption start temperature of the $NO_X$ holding material of the reactor 45.

In the example shown in FIG. 5, at the time t1, the internal combustion engine is cold started. Therefore, before the time t1, the temperatures of the exhaust purification catalyst 44 and reactor 45 are both low. After that, if the internal combustion engine is started at the time t1, exhaust gas containing $NO_X$ is discharged from the engine body. At this time, the temperature of the exhaust purification catalyst 44 is less than the activation temperature Tact, therefore at the exhaust purification catalyst 44, almost none of the $NO_X$ in the exhaust gas is purified. As a result, exhaust gas including $NO_X$ flows into the reactor 45.

Further, in the example shown in FIG. 5, at the time t1, at the same time as the startup of the internal combustion engine, voltage starts to be applied to the reactor 45. For this reason, after the time t1, $NO_X$ is purified on the cathode layer 77. However, the speed of flow of $NO_X$ to the reactor 45 is faster than the speed of purification of $NO_X$ on the reactor 45, therefore the amount of $NO_X$ held at the $NO_X$ holding material of the reactor 45 increases. On the other hand, since the $NO_X$ in the exhaust gas flowing into the reactor 45 is held at the $NO_X$ holding material, the exhaust gas flowing out from the reactor 45 does not contain much $NO_X$ at all.

Then, high temperature exhaust gas flows into the exhaust purification catalyst 44, therefore the temperature of the exhaust purification catalyst 44 rises. As the temperature of the exhaust purification catalyst 44 gradually rises, the rate of purification of $NO_X$ at the exhaust purification catalyst 44 becomes higher. If at the time t2 the temperature of the exhaust purification catalyst 44 reaches the activation temperature Tact, from there on, almost no $NO_X$ flows out from the exhaust purification catalyst 44 any longer. As a result, after the time t2, almost no $NO_X$ flows into the reactor 45. On the other hand, after the time t2, voltage continues to be applied to the reactor 45, therefore the $NO_X$ which had been held at the $NO_X$ holding material of the reactor 45 is gradually purified.

However, if the temperature of the exhaust purification catalyst 44 becomes higher, the temperature of the exhaust gas flowing into the reactor 45 arranged at the downstream side from the exhaust purification catalyst 44 rises. As a result, after the time t2, the temperature of the reactor 45 also rapidly rises. Finally, at the time t3, the temperature becomes equal to or greater than the desorption start temperature Tde. For this reason, after the time t3, the $NO_X$ held at the $NO_X$ holding material of the reactor 45 is desorbed. Accordingly, $NO_X$ flows out from the reactor 45.

In the example shown in FIG. 5, the explanation was given for $NO_X$, but the same is true for unburned HC. Therefore, there is the possibility of unburned HC also flowing out from the reactor 45.

Control of Exhaust Purification System

Therefore, in the exhaust purification system according to the present embodiment, the control device 50 controls the flow control valve 47 so as to control the amount of exhaust gas flowing into the reactor 45 so that the temperature of the reactor 45 is maintained at less than the desorption start temperature where $NO_X$ or HC starts to be desorbed from the $NO_X$ holding material or HC holding material (below, these also referred to as the "holding materials").

Figure 6:
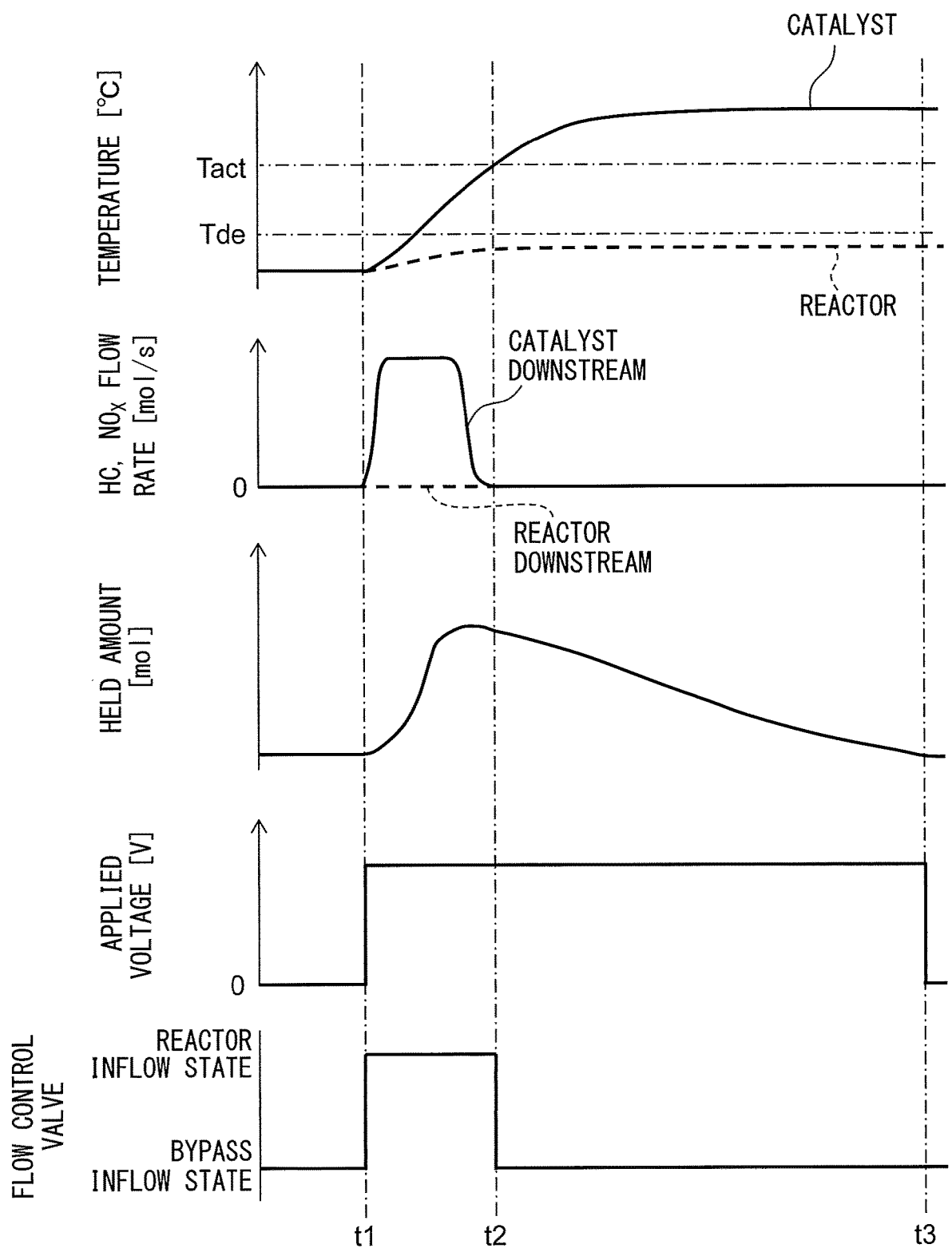
FIG. 6 is a time chart of temperatures of an exhaust purification catalyst and reactor, etc., at the time of cold start of an internal combustion engine in an exhaust purification system according to the first embodiment.

FIG. 6 is a time chart of temperatures of an exhaust purification catalyst 44 and reactor 45, amounts of outflow of $NO_X$ from the exhaust purification catalyst 44 and reactor 45, amount of $NO_X$ held at the $NO_X$ holding material of the reactor 45, voltage applied to the reactor 45, and control state of the flow control valve 47, at the time of cold start of an internal combustion engine in an exhaust purification system according to the present embodiment.

In the example shown in FIG. 6 as well, in the same way as the example shown in FIG. 5, the internal combustion engine 1 is cold started at the time t1. When the internal combustion engine 1 is started at the time t1, the temperature of the exhaust purification catalyst 44 is a low temperature less than the activation temperature. In the present embodiment, when the temperature of the exhaust purification catalyst 44 is less than the activation temperature, the flow control valve 47 is controlled to the reactor inflow state. Therefore, if the internal combustion engine 1 is started at the time t1, the $NO_X$ in the exhaust gas is not purified at the exhaust purification catalyst 44 because of the temperature of the exhaust purification catalyst 44 being low, and exhaust gas containing $NO_X$ flows into the reactor 45.

Further, in the present embodiment, if the flow control valve 47 is in a reactor inflow state, the reactor 45 is energized. Therefore, even in the example shown in FIG. 6, in the same way as the example shown in FIG. 5, at the time t1, voltage starts to be applied to the reactor 45 at the same time as the start of the internal combustion engine. However, the speed of inflow of $NO_X$ to the reactor 45 is fast, therefore after the time t1, the amount of $NO_X$ held at the $NO_X$ holding material of the reactor 45 increases. On the other hand, the $NO_X$ in the exhaust gas flowing into the reactor 45 is held at the $NO_X$ holding material, therefore the exhaust gas flowing out from the reactor 45 does not contain almost any $NO_X$.

Then, after the time t1, the temperature of the exhaust purification catalyst 44 rises and at the time t2 reaches the activation temperature Tact. In the present embodiment, at this time, the temperature of the reactor 45 is less than the desorption start temperature Tde. In other words, in the present embodiment, the exhaust purification catalyst 44 and reactor 45 are configured so that when the internal combustion engine 1 is cold started, even if the flow control valve 47 is controlled to the reactor inflow state, the temperature of the exhaust purification catalyst 44 reaches the activation temperature Tact before the temperature of the reactor 45 reaches the desorption start temperature Tde. Specifically, the reactor 45 is, for example, arranged at a certain extent of distance from the exhaust purification catalyst 44. Alternatively, a separate exhaust purification catalyst may be provided between the exhaust purification catalyst 44 and the reactor 45.

If at the time t2 the temperature of the exhaust purification catalyst 44 reaches the activation temperature Tact, in the present embodiment, the flow control valve 47 is controlled so that exhaust gas does not flow into the reactor 45, that is, to the bypass inflow state. Since the temperature of the exhaust purification catalyst 44 is equal to or greater than the activation temperature Tact, the exhaust gas flowing out from the exhaust purification catalyst 44 does not contain much $NO_X$ at all. For this reason, even if the exhaust gas does not flow into the reactor 45, the exhaust gas flowing out from the exhaust purification catalyst 44 does not contain much $NO_X$ at all. After that, so long as the temperature of the exhaust purification catalyst 44 is equal to or greater than the activation temperature Tact, the flow control valve 47 continues to be controlled to the bypass inflow state so that exhaust gas does not flow into the reactor 45.

Further, after the time t2, exhaust gas does not flow into the reactor 45, therefore the temperature of the reactor 45 no longer rises. Therefore, the temperature of the reactor 45 is maintained at less than the desorption start temperature Tde. Furthermore, in the present embodiment, when the flow control valve 47 is in the bypass inflow state, if it is estimated that the $NO_X$ holding material of the reactor 45 is holding $NO_X$, the reactor 45 is energized. Therefore, after the time t2 as well, voltage continues to be applied to the reactor 45, therefore the $NO_X$ held at the $NO_X$ holding material of the reactor 45 gradually decreases and finally at the time t3 becomes substantially zero. In the present embodiment, if it is estimated that the amount of $NO_X$ held by the $NO_X$ holding material has become substantially zero, voltage stops being applied to the reactor 45.

In the exhaust purification system of the present embodiment, before the temperature of the reactor 45 reaches the desorption start temperature Tde, the flow control valve 47 is switched from the reactor inflow state to the bypass inflow state. As a result, the temperature of the reactor 45 is maintained at less than the desorption start temperature Tde, and accordingly $NO_X$ is kept from being desorbed from the $NO_X$ holding material of the reactor 45. Therefore, according to the exhaust purification system of the present embodiment, $NO_X$ held at the $NO_X$ holding material is kept from being desorbed without being purified, and the performance of the exhaust purification system in purifying $NO_X$ can be raised.

Flow Chart

Figure 7:
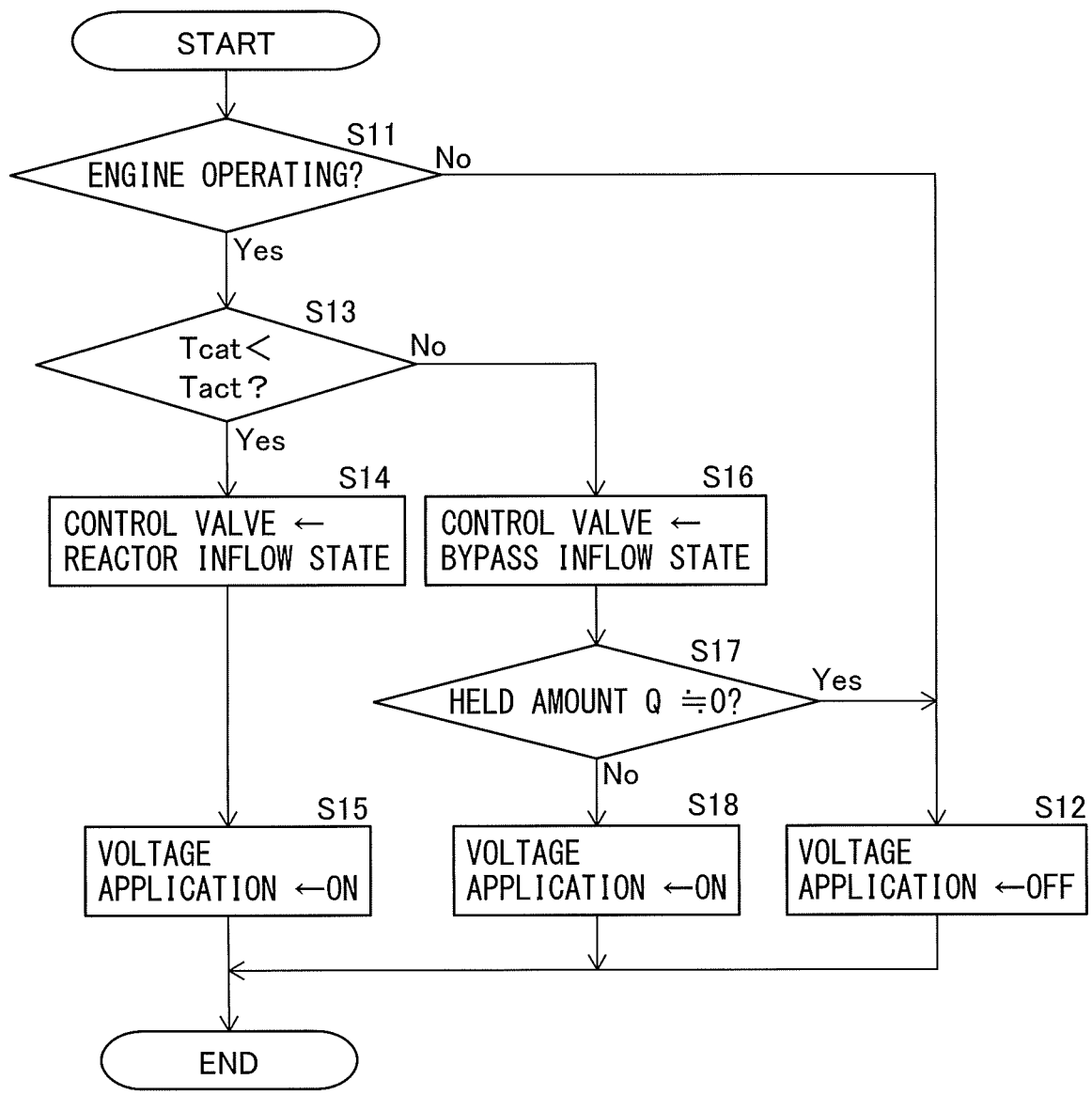
FIG. 7 is a flow chart which shows a control routine of control of an exhaust purification system according to the first embodiment.

FIG. 7 is a flow chart showing a control routine of control of an exhaust purification system according to the present embodiment. The illustrated control routine is performed every certain time interval.

First, at step S11, it is judged if the internal combustion engine 1 is operating. Whether the internal combustion engine 1 is operating is, for example, judged based on whether the ignition switch of the vehicle mounting the internal combustion engine 1 is set to ON or whether the engine speed is zero. Before the start of the internal combustion engine 1, at step S11, it is judged that the internal combustion engine 1 is not operating and the control routine proceeds to step S12. At step S12, application of voltage to the reactor 45 is turned OFF and the control routine is ended.

Then, if the internal combustion engine 1 is started, at the next control routine, it is judged, at step S11, that the internal combustion engine 1 is operating and the control routine proceeds to step S13. At step S13, it is judged if the temperature of the exhaust purification catalyst 44 is less than the activation temperature Tact based on the output of the temperature sensor 64 detecting the temperature of the exhaust purification catalyst 44. If it is judged that the exhaust purification catalyst 44 is not sufficiently warmed and the temperature is less than the activation temperature Tact, the control routine proceeds to step S14.

At step S14, the flow control valve 47 is controlled to the reactor inflow state. Next, at step S15, application of voltage to the reactor 45 is turned ON. Therefore, the exhaust gas flows into the reactor 45, and the $NO_X$ is purified at the reactor 45.

Then, if the temperature of the exhaust purification catalyst 44 rises to equal to or greater than the activation temperature Tact, the next control routine proceeds from step S13 to step S16. At step S16, the flow control valve 47 is controlled to the bypass inflow state.

Next, at step S17, it is judged if the estimated value Q of the amount of $NO_X$ held at the $NO_X$ holding material of the reactor 45 has decreased to substantially zero. The amount of the $NO_X$ held is, for example, estimated based on the time elapsed from when the flow control valve 47 is switched to the bypass inflow state. However, the amount of the held $NO_X$ may be estimated based on other parameters. Specifically, it may be estimated based on the maximum value of the $NO_X$ able to be held by the $NO_X$ holding material of the reactor 45, the amount of $NO_X$ purified per unit time by energizing the reactor 45, the temperature of the reactor 45 detected by the temperature sensor 64, etc.

If at step S17 it is judged that the estimated value Q of the amount of the held $NO_X$ is not zero, the routine proceeds to step S18. At step S18, the application of voltage to the reactor 45 is turned ON. Therefore, at the reactor 45, the $NO_X$ held at the $NO_X$ holding material is purified in the state with no exhaust gas flowing in. On the other hand, if at step S17 it is judged that the estimated value Q of the amount of the held $NO_X$ is substantially zero, the routine proceeds to step S12 where the application of voltage to the reactor 45 is turned OFF.

Modification

Note that, the control of the above embodiment is performed considering the $NO_X$ held at the $NO_X$ holding material of the reactor 45, but such control may also be performed considering the HC held at the HC holding material of the reactor 45 in place of or in addition to the $NO_X$ held at the $NO_X$ holding material. In this case, the exhaust purification catalyst 44 and reactor 45 are configured so that when the internal combustion engine 1 is cold started, even if the flow control valve 47 is controlled to the reactor inflow state, the temperature of the exhaust purification catalyst 44 reaches the activation temperature Tact before the temperature of the reactor 45 reaches the desorption start temperature of HC or before it reaches a lower temperature among the desorption start temperatures of HC and $NO_X$. Further, in this case, at step S17, it is judged if the estimated value of the amount of held HC of the HC holding material is substantially zero or if both of the estimated value of the amount of the held $NO_X$ and the estimated value of the amount of held HC are substantially zero.

Further, in the above embodiments, if the temperature of the exhaust purification catalyst 44 becomes equal to or greater than the activation temperature, the flow control valve 47 is switched from the reactor inflow state to the bypass inflow state. However, if it is possible to maintain the temperature of the reactor 45 at less than the desorption start temperature of $NO_X$ or HC, the flow control valve 47 may also be controlled based on other conditions.

Therefore, for example, the flow control valve 47 may be controlled based on the temperature of the reactor 45. In this case, for example, at the time of cold start of the internal combustion engine, the flow control valve 47 is controlled to the reactor inflow state. If the temperature of the reactor 45 reaches a predetermined temperature of less than the desorption start temperature, the flow control valve 47 is controlled to the bypass inflow state. The temperature of the reactor 45 at this time may be detected by the temperature sensor 64 and may be estimated based on the amount of flow of the exhaust gas, etc.

Furthermore, in the above embodiment, the flow control valve 47 functions as a switching valve substantially switching between two states of a reactor inflow state and a bypass inflow state. However, the flow control valve 47 may also be controlled so as to change in stages the amount of flow of exhaust gas flowing into the reactor 45 and the bypass pipe 46. Specifically, the flow control valve 47, for example, may also be changed from the reactor inflow state to a state of inflow to both the reactor 45 and the bypass pipe 46, when the exhaust purification catalyst 44 reaches the activation temperature. In addition, in this case, the flow control valve 47 may be controlled so that the amount of flow of the exhaust gas flowing into the reactor 45 becomes smaller as the temperature of the reactor 45 becomes higher toward the desorption start temperature.

Second Embodiment

Next, referring to FIGS. 8 to 10, an exhaust purification system according to the second embodiment will be explained. The configuration and control of the exhaust purification system according to the second embodiment are similar to the configuration and control of the exhaust purification system according to the first embodiment, therefore below, parts different from the exhaust purification system according to the first embodiment will be focused on in the explanation.

Configuration of Exhaust Purification System

Figure 8:
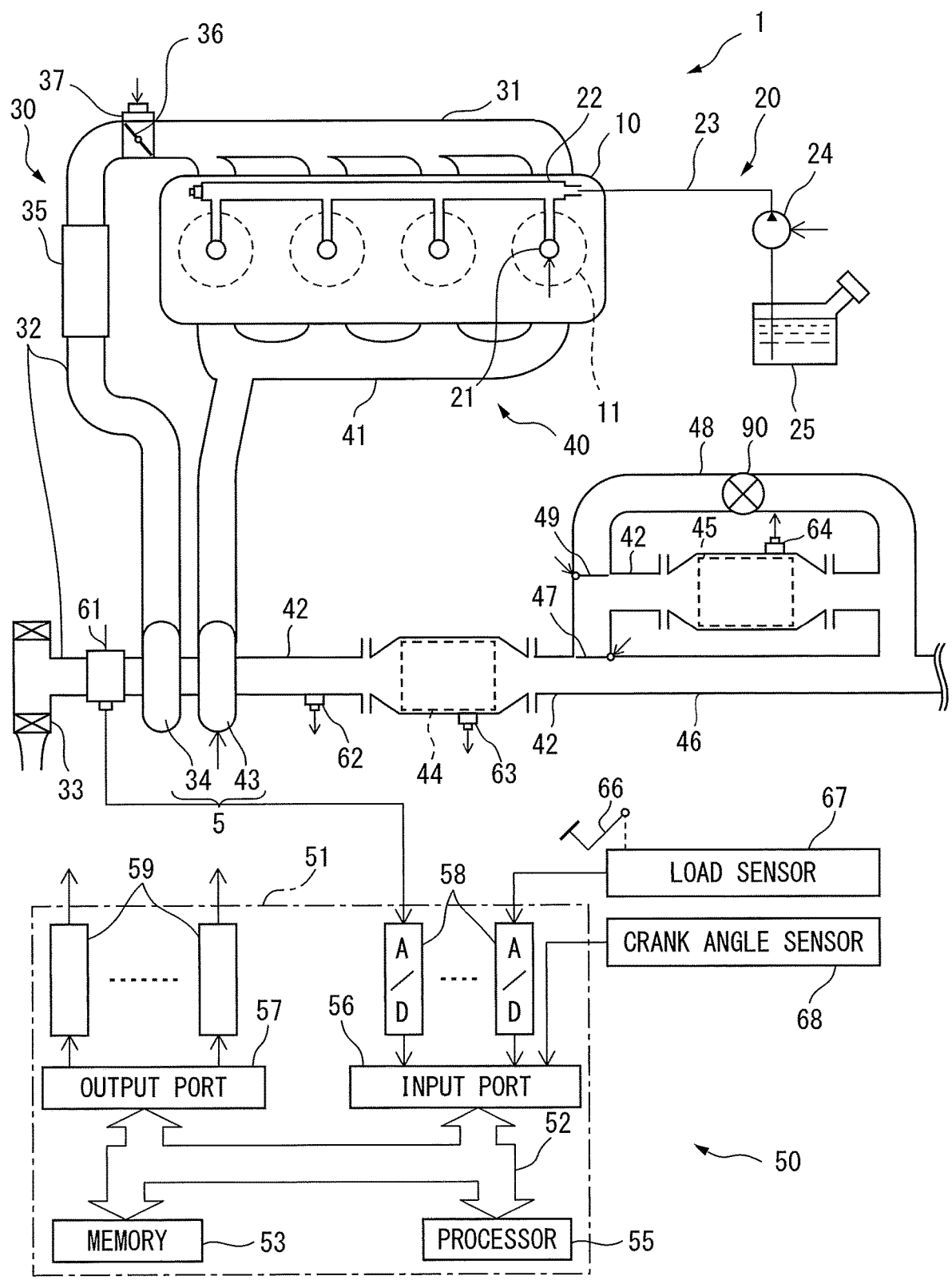
FIG. 8 is a schematic view of the configuration, similar to FIG. 1, of an internal combustion engine provided with an exhaust purification system according to a second embodiment.

FIG. 8 is a schematic view of a configuration, similar to FIG. 1, of an internal combustion engine 1 provided with an exhaust purification system according to a second embodiment. As shown in FIG. 8, in the present embodiment, the exhaust system 40 is further provided with a second bypass pipe 48, on-off valve 49, and circulation pump 90.

The second bypass pipe 48 defines a second bypass passage bypassing the reactor 45. Therefore, the second bypass pipe 48 branches from the exhaust pipe 42 at the upstream side from the reactor 45, and merges with the exhaust pipe 42 at the downstream side from the reactor 45. In addition, the second bypass pipe 48 branches from the exhaust pipe 42 at the downstream side from the branching part of the bypass pipe 46 (below, also referred to as the "first bypass pipe") and merges with the exhaust pipe 42 at the upstream side from the merging part of the first bypass pipe 46.

The on-off valve 49 is provided at the branching part of the second bypass pipe 48 and opens and closes the second bypass pipe 48. Therefore, when the on-off valve 49 is opened, the exhaust gas can flow through the second bypass pipe 48, but when the on-off valve is closed, the exhaust gas cannot flow through the second bypass pipe 48. Note that, the on-off valve 49 may also be provided anywhere of the second bypass pipe 48 if able to open and close the second bypass pipe 48.

The circulation pump 90 can send the exhaust gas in the second bypass pipe 48 toward the merging part side from the branching part side or the reverse. The circulation pump 90 is connected through the corresponding drive circuit 59 to the output port 57 of the ECU 51.

In the thus configured exhaust purification system, the second bypass pipe 48 and the exhaust pipe 42 between the branching part and merging part of the second bypass pipe 48 configure the circulation passage. The circulation passage is provided with the reactor 45 and circulation pump 90.

Note that, the merging part of the first bypass pipe 46 may also be provided with a switching valve for switching the flow path of the exhaust gas. The switching valve is configured to be able to be switched between at least a bypass flow state where the exhaust pipe 42 downstream from the merging part of the first bypass pipe 46 is communicated with the bypass pipe and a reactor communicating state communicating with the reactor 45. The switching valve is set to the reactor communicating state when the flow control valve 47 is in the reactor inflow state and is set to the bypass communicating state when the flow control valve 47 is in the bypass inflow state.

Control of Exhaust Purification System

Figure 9:
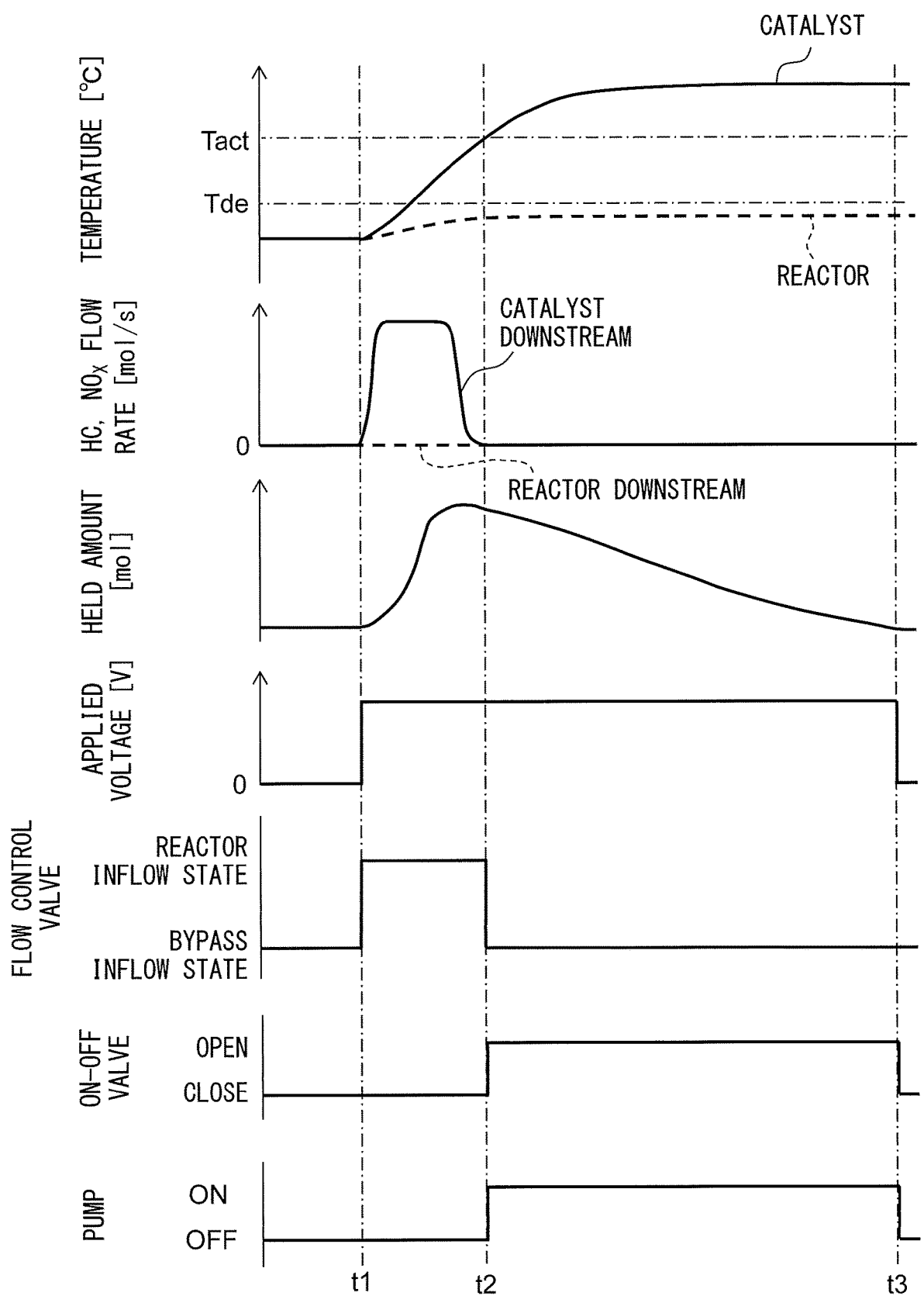
FIG. 9 is a time chart, similar to FIG. 6, of temperatures of an exhaust purification catalyst and reactor, etc., at the time of cold start of an internal combustion engine in an exhaust purification system according to the second embodiment.

FIG. 9 is a time chart, similar to FIG. 6, of temperatures of an exhaust purification catalyst 44 and reactor 45, etc., at the time of cold start of an internal combustion engine in an exhaust purification system according to present embodiment. In the example shown in FIG. 9 as well, at the time t1, the internal combustion engine 1 is cold started.

When at the time t1 the internal combustion engine 1 is cold started, the on-off valve 49 is in a closed state. Therefore, the exhaust gas flowing out from the exhaust purification catalyst 44 flows into the reactor 45 without flowing into the second bypass pipe 48. Further, at this time, the circulation pump 90 is not driven. Therefore, in the circulation passage, exhaust gas is not circulated.

Then, if, at the time t2, the flow control valve 47 is controlled to the bypass inflow state, along with this, the on-off valve 49 is opened and the circulation pump 90 is driven. Therefore, after the time t2 where the flow control valve 47 is controlled to the bypass inflow state, the exhaust gas circulates in the circulation passage.

Further, after the time t2 as well, the reactor 45 is energized. For this reason, the $NO_X$ held at the $NO_X$ holding material of the reactor 45 is gradually decreased, and finally at the time t3 becomes substantially zero. In the present embodiment, if the amount of $NO_X$ held by the $NO_X$ holding material is estimated as having become substantially zero, the on-off valve 49 is closed and the circulation pump 90 is stopped.

In the exhaust purification system of the present embodiment, during the times t2 to t3, the exhaust gas in the circulation passage is circulated, therefore the substance generated by the reaction at the reactor 45 is kept from dwelling around the reactor 45. As a result, the generated substance is kept from dwelling around the reactor 45 and obstructing the reaction, and $NO_X$ can be efficiently purified at the reactor 45.

Flow Chart

Figure 10:
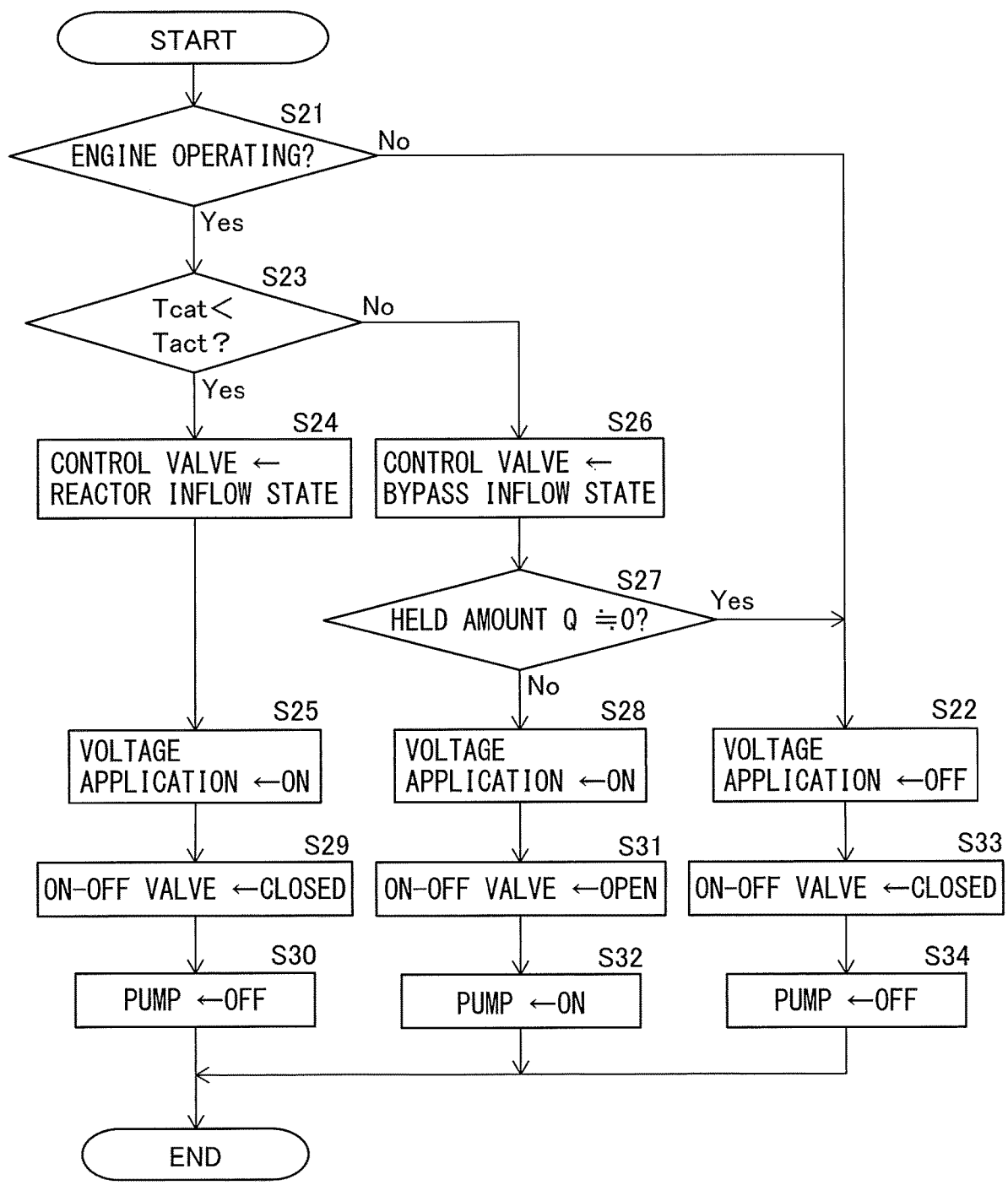
FIG. 10 is a flow chart which shows a control routine of control of an exhaust purification system according to the second embodiment.

FIG. 10 is a flow chart showing a control routine of control of an exhaust purification system according to the present embodiment. The illustrated control routine is performed every certain time interval. Steps S21 to S28 in the figure are similar to steps S11 to S18 of FIG. 7, therefore explanations will be omitted.

As shown in FIG. 10, if at step S23 it is judged that the temperature of the exhaust purification catalyst 44 is less than the activation temperature Tact, the control routine proceeds through steps S24, S25 to step S29. At step S29, the on-off valve 49 is closed and at the next step S30, the circulation pump 90 is stopped.

On the other hand, if at step S23 it is judged that the temperature of the exhaust purification catalyst 44 is equal to or greater than the activation temperature Tact and it is judged that the estimated value Q of the amount of $NO_X$ held at step S27 is not zero, the control routine proceeds through step S28 to step S31. At step S31, the on-off valve 49 is opened and at the next step S32, the circulation pump 90 is driven.

Further, if at step S27 it is judged that the estimated value Q of the amount of held $NO_X$ is substantially zero and if at step S21 it is judged that the internal combustion engine 1 is not operating, the control routine proceeds through step S22 to step S33. At step S33, the on-off valve 49 is closed and at the next step S32, the circulation pump 90 is stopped.

Modification

Figure 11:
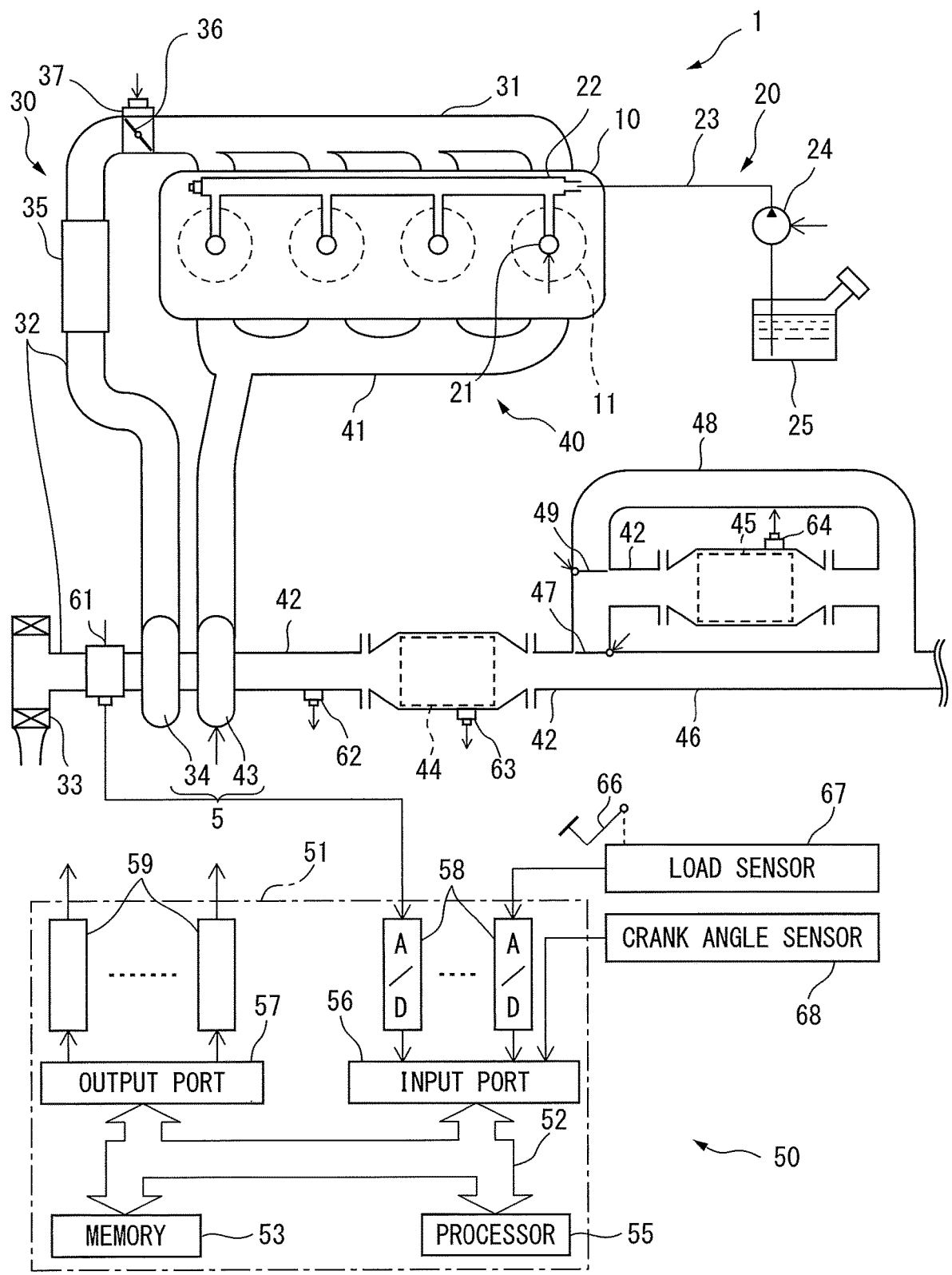
FIG. 11 is a schematic view of the configuration, similar to FIG. 8, of an internal combustion engine 1 mounting an exhaust purification system according to a modification of the second embodiment.

Referring to FIG. 11, a modification of the exhaust purification catalyst according to the second embodiment will be explained. FIG. 11 is a schematic view of a configuration similar to FIG. 8 of an internal combustion engine 1 mounting an exhaust purification system according to the present modification.

As will be understood from FIG. 11, in the present modification, the exhaust purification system is not provided with the circulation pump 90. On the other hand, in the present modification, the exhaust pipe (first passage) 42 between the branching part and merging part of the first bypass pipe 46 is arranged relatively near the first bypass pipe 46 in parallel. On the other hand, the second bypass pipe (second passage) 48 is arranged relatively far from the first bypass pipe 46 in parallel. In addition, the exhaust pipe (below, also referred to as the "main exhaust pipe") 42 between the branching part and merging part of the first bypass pipe 46 and the second bypass pipe 48 are arranged offset from each other in the vertical direction. In particular, in the present embodiment, the main exhaust pipe 42 is arranged so as to be positioned relatively lower than the second bypass pipe 48 in the vertical direction.

In the thus configured exhaust purification system, the flow control valve 47 and the on-off valve 49 are controlled in the same way as the second embodiment. Therefore, after the exhaust purification catalyst 44 reaches the activation temperature, the flow control valve 47 is rendered the bypass inflow state, and the on-off valve 49 is opened.

At this time, the main exhaust pipe 42 is arranged in proximity to the first bypass pipe 46 through which the high temperature exhaust gas flows. For this reason, due to the heat from the first bypass pipe 46, the exhaust gas in the main exhaust pipe 42 is also slightly raised in temperature. On the other hand, the second bypass pipe 48 is arranged separated from the first bypass pipe 46, therefore the heat from the first bypass pipe 46 is not transmitted, and thus the exhaust gas in the first bypass pipe 46 is not raised in temperature much at all. Therefore, the temperature of the exhaust gas in the main exhaust pipe 42 arranged at the lower side in the vertical direction in the circulation passage becomes higher than the temperature of the exhaust gas inside the second bypass pipe 48 arranged at the upper side in the vertical direction. As a result, due to the temperature difference of the exhaust gas and height difference, inside the circulation passage, the exhaust gas circulates. Therefore, in the present modification as well, the circulation passage can be said to be configured so that the exhaust gas circulates in the circulation passage when the flow control valve 47 is controlled to the bypass inflow state.

Note that, in the present modification, the second bypass pipe 48 is not provided with the circulation pump 90, but in the same way as the second embodiment, the second bypass pipe 48 may also be provided with the circulation pump 90. Further, in the present modification, between the main exhaust pipe 42 and the second bypass pipe 48, a level difference is provided, but they may also be provided horizontal with respect to each other. Furthermore, in the present modification, the main exhaust pipe 42 is arranged relatively close to the first bypass pipe 46 and relatively lower than the second bypass pipe 48 in the vertical direction. However, the second bypass pipe 48 may also be arranged relatively close to the first bypass pipe 46 and relatively lower than the main exhaust pipe 42 in the vertical direction.

The invention claimed is:

1. An exhaust purification system of an internal combustion engine, comprising:
   an electrochemical reactor provided in an engine exhaust passage;
   a bypass passage bypassing the electrochemical reactor; a flow control valve controlling an amount of exhaust gas, discharged from an engine body, flowing into the electrochemical reactor and the bypass passage; and
   an ECU controlling the flow control valve, wherein
   the electrochemical reactor comprises a holding material holding NOX or HC and is configured so as to purify NOX or HC held at the holding material if energized,
   the ECU is configured to control the flow control valve so as to control the amount of exhaust gas flowing into the electrochemical reactor so that a temperature of the electrochemical reactor is maintained at less than a desorption start temperature where NOX or HC starts to be desorbed from the holding material, and
   the ECU is configured to control the flow control valve so that all of the exhaust gas flows into the electrochemical reactor at a time of cold start of the internal combustion engine, and control the flow control valve so that the exhaust gas does not flow into the electrochemical reactor if the temperature of the electrochemical reactor reaches a predetermined temperature less than the desorption start temperature.

2. The exhaust purification system of an internal combustion engine according to claim 1, wherein in the engine exhaust passage, an exhaust purification catalyst is provided at an upstream side from a branching part to the bypass passage.

3. The exhaust purification system of an internal combustion engine according to claim 2, wherein the ECU is configured to control the flow control valve so that exhaust gas does not flow into the electrochemical reactor when a temperature of the exhaust purification catalyst is equal to or greater than an activation temperature.

4. The exhaust purification system of an internal combustion engine according to claim 2, wherein the ECU is configured to control the flow control valve so that all of the exhaust gas flows into the electrochemical reactor when a temperature of the exhaust purification catalyst is less than an activation temperature.

5. The exhaust purification system of an internal combustion engine according to claim 2, wherein the exhaust purification catalyst and the electrochemical reactor are configured so that when the internal combustion engine is cold started, even if the flow control valve is controlled so that all of the exhaust gas flows into the electrochemical reactor, the temperature of the exhaust purification catalyst reaches an activation temperature before the temperature of the electrochemical reactor reaches the desorption start temperature.

6. An exhaust purification system of an internal combustion engine, comprising:
   an electrochemical reactor provided in an engine exhaust passage; a bypass passage bypassing the electrochemical reactor;
   a flow control valve controlling an amount of exhaust gas, discharged from an engine body, flowing into the electrochemical reactor and the bypass passage; and
   an ECU controlling the flow control valve, wherein
   the electrochemical reactor comprises a holding material holding $NO_X$ or HC and is configured so as to purify $NO_X$ or HC held at the holding material if energized,
   the ECU is configured to control the flow control valve so as to control the amount of exhaust gas flowing into the electrochemical reactor so that a temperature of the electrochemical reactor is maintained at less than a desorption start temperature where $NO_X$ or HC starts to be desorbed from the holding material,
   the ECU is configured to control energization of the electrochemical reactor, and
   the ECU is configured to energize the electrochemical reactor, when the flow control valve is controlled so that exhaust gas flows into the electrochemical reactor, and energizes the electrochemical reactor, when it is estimated that the holding material is holding the NOX or HC, when the flow control valve is controlled so that exhaust gas does not flow into the electrochemical reactor.

7. An exhaust purification system of an internal combustion engine, comprising:
   an electrochemical reactor provided in an engine exhaust passage; a bypass passage bypassing the electrochemical reactor;
   a flow control valve controlling an amount of exhaust gas, discharged from an engine body, flowing into the electrochemical reactor and the bypass passage;
   an ECU controlling the flow control valve; and
   a circulation passage provided between a branching part and merging part of the bypass passage and straddling the electrochemical reactor, wherein
   the electrochemical reactor comprises a holding material holding $NO_X$ or HC and is configured so as to purify $NO_X$ or HC held at the holding material if energized,
   the ECU is configured to control the flow control valve so as to control the amount of exhaust gas flowing into the electrochemical reactor so that a temperature of the electrochemical reactor is maintained at less than a desorption start temperature where $NO_X$ or HC starts to be desorbed from the holding material, and the circulation passage is configured so that the exhaust gas circulates in the circulation passage when the flow control valve is controlled so that exhaust gas does not flow into the electrochemical reactor.

8. The exhaust purification system of an internal combustion engine according to claim 7, wherein the circulation passage is provided with a circulation pump for making exhaust gas circulate in the circulation passage.

9. The exhaust purification system of an internal combustion engine according to claim 7, wherein the circulation passage comprises a first passage relatively close to the bypass passage and a second passage relatively far from the bypass passage, and the first passage and the second passage are arranged offset from each other in a vertical direction.

* * * * *